United States Patent [19]
Bedarida

[11] Patent Number: 5,913,228
[45] Date of Patent: Jun. 15, 1999

[54] METHOD AND APPARATUS FOR CACHING DISCONTIGUOUS ADDRESS SPACES WITH SHORT CACHE TAGS

[75] Inventor: Alessandro Bedarida, Santa Clara, Calif.

[73] Assignee: VLSI Technology, Inc., San Jose, Calif.

[21] Appl. No.: 08/820,409

[22] Filed: Mar. 12, 1997

[51] Int. Cl.$^6$ .................................................. G06F 11/00
[52] U.S. Cl. .......................... 711/170; 711/117; 711/171; 711/172; 711/144
[58] Field of Search .................................. 711/172, 128, 711/3, 207, 118, 170; 395/800.37

[56] References Cited

U.S. PATENT DOCUMENTS

| | | | |
|---|---|---|---|
| 4,926,314 | 5/1990 | Dhuey ...................................... | 711/172 |
| 5,175,859 | 12/1992 | Miller et al. ........................ | 395/800.37 |
| 5,367,653 | 11/1994 | Coyle et al. ............................. | 711/128 |
| 5,483,644 | 1/1996 | Richardson .................................. | 711/3 |
| 5,511,180 | 4/1996 | Shieve ...................................... | 711/172 |
| 5,574,877 | 11/1996 | Dixit et al. ............................. | 711/207 |
| 5,682,515 | 10/1997 | Lau et al. ................................ | 711/118 |
| 5,694,567 | 12/1997 | Bourekas et al. ........................... | 711/3 |

*Primary Examiner*—John W. Cabeca
*Assistant Examiner*—Fred F. Tzeng
*Attorney, Agent, or Firm*—Wagner, Murabito & Hao

[57] ABSTRACT

A method and apparatus for determining whether an address corresponds to a cacheable memory location within a discontiguously-arranged cacheable memory space. In one embodiment, the present invention includes the following steps: First the present invention receives an address for a memory location. Next, the present invention masks a first portion of the received address with an "admask" and compares the result of the admask itself to determine whether they are a predetermined value. The present invention also masks a second portion of the received address with a "tagmask" and compares the result to the tagmask itself to determine whether they are a predetermined value. Next, the present invention generates a cacheable signal provided the first portion of the received address matches the admask and the second portion of the received address matches the tagmask. In so doing, the present invention provides a method and apparatus for caching discontiguous memory address spaces with shorter cache tags.

25 Claims, 9 Drawing Sheets

| Cache Size (KB) | Tag Width | Cacheable Mem (MB) | Cacheable RAM (MB) | admask [31:26] | tagmask [30:24] |
|---|---|---|---|---|---|
| 256 | 8 | 64 | 48 | 111111 | 0000011' |
| 512 | 7 | 64 | 48 | 111111 | 0000011 |
| 1024 | 6 | 64 | 48 | 111111 | 0000011 |
| 2048 | 5 | 64 | 48 | 111111 | 0000011 |
| 256 | 9 | 128 | 112 | 111110 | 0000111 |
| 512 | 8 | 128 | 112 | 111110 | 0000111 |
| 1024 | 7 | 128 | 112 | 111110 | 0000111 |
| 2048 | 6 | 128 | 112 | 111110 | 0000111 |
| 256 | 10 | 256 | 240 | 111100 | 0001111 |
| 512 | 9 | 256 | 240 | 111100 | 0001111 |
| 1024 | 8 | 256 | 240 | 111100 | 0001111 |
| 2048 | 7 | 256 | 240 | 111100 | 0001111 |
| 256 | 11 | 512 | 496 | 111000 | 0011111 |
| 512 | 10 | 512 | 496 | 111000 | 0011111 |
| 1024 | 9 | 512 | 496 | 111000 | 0011111 |
| 2048 | 8 | 512 | 496 | 111000 | 0011111 |
| 256 | 12 | 1024 | 1008 | 110000 | 0111111 |
| 512 | 11 | 1024 | 1008 | 110000 | 0111111 |
| 1024 | 10 | 1024 | 1008 | 110000 | 0111111 |
| 2048 | 9 | 1024 | 1008 | 110000 | 0111111 |
| 256 | 13 | 2048 | 2032 | 100000 | 1111111 |
| 512 | 12 | 2048 | 2032 | 100000 | 1111111 |
| 1024 | 11 | 2048 | 2032 | 100000 | 1111111 |
| 2048 | 10 | 2048 | 2032 | 100000 | 1111111 |
| 256 | 14 | 4096 | 4080 | 000000 | Don't Care |
| 512 | 13 | 4096 | 4080 | 000000 | Don't Care |
| 1024 | 12 | 4096 | 4080 | 000000 | Don't Care |
| 2048 | 11 | 4096 | 4080 | 000000 | Don't Care |

METHOD AND APPARATUS FOR CACHING DISCONTIGUOUS ADDRESS SPACES WITH SHORT CACHE TAGS

TECHNICAL FIELD

The present claimed invention relates to the field of semiconductor devices. More specifically, the present claimed invention relates to semiconductor cache memory controllers.

BACKGROUND ART

Within most computer systems, a central processing unit (CPU) is connected to cache memory. Cache memory can be quickly accessed by the CPU. As a result, data can be stored in or retrieved from cache memory much faster than the same data could be stored in or retrieved from various other storage media coupled to the CPU. Cache memory is located within a cache memory unit comprised of computer system hardware (e.g., random access memory (RAM), read only memory (ROM), busses, logic components, etc.). Data in a cache memory is organized in "lines". A cache line is the addressable entity of a cache memory.

A cache memory unit within a computer system gains several benefits when a portion of the cache address, the cache tag, is minimized (i.e., shortened). With a short cache tag width, the cache memory unit is less expensive to produce, requires smaller components to implement, generates less heat, and weighs less than a cache memory unit using a larger cache tag width.

Figure 1:
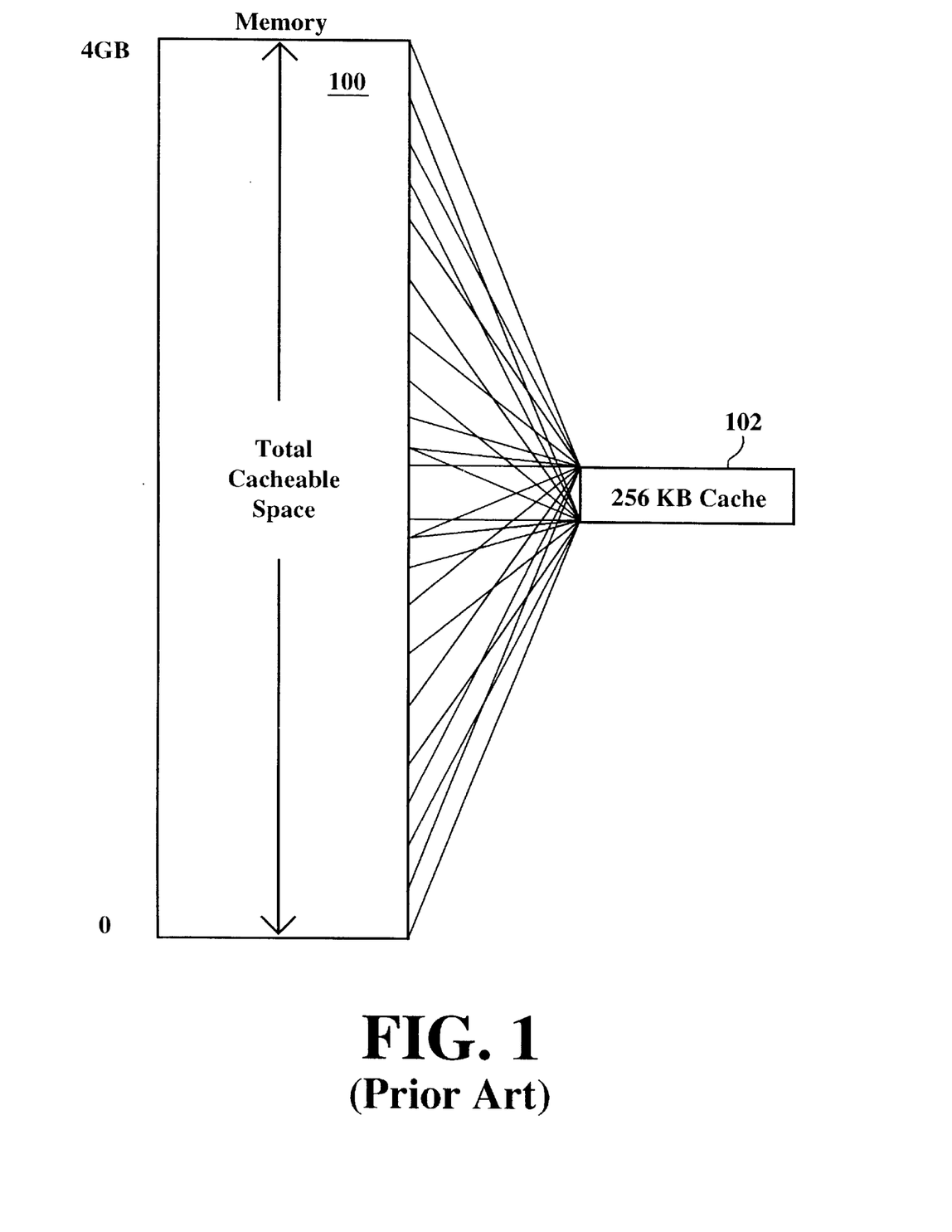
FIG. 1 is a schematic illustration of addressable memory space associated with a prior-art method of reconstructing the address of a cache line.

Prior Art FIG. 1 is a schematic illustration of 4 gigabytes (GB) of addressable memory space 100. Additionally, the cache memory chunk 102 employed in the embodiment of Prior Art FIG. 1 has a total size of 256 kilobytes (KB). In order to access data within 4 GB of addressable space 100, a 32-bit address is required. Equation 1 below is used to determine the cache tag width conventionally required to address a particular location of data within the large cacheable space, when a direct-mapped cache is used. Although the following discussion is limited to direct-mapped cache for purposes of clarity, the present invention is also well suited to use with fully set associative, or various other cache configurations.

$$\log_2(\text{cacheable space}/\text{cache size}) = \text{cache tag width} \quad (1)$$

As shown above, Equation 1 divides the total amount of cacheable space by the cache size. After the division, the resultant value is then logged by base 2. Inserting the values for Prior Art FIG. 1 into Equation 1 produces the resultant expression and value:

$$\log_2(4 \text{ GB}/256 \text{ KB}) = 14.$$

Thus, in the embodiment of Prior Art FIG. 1 the cache tag must be 14 bits wide for a CPU to reconstruct the full 32-bit address necessary to identify a cache line within 4 GB contiguous cacheable space 100.

Figure 2:
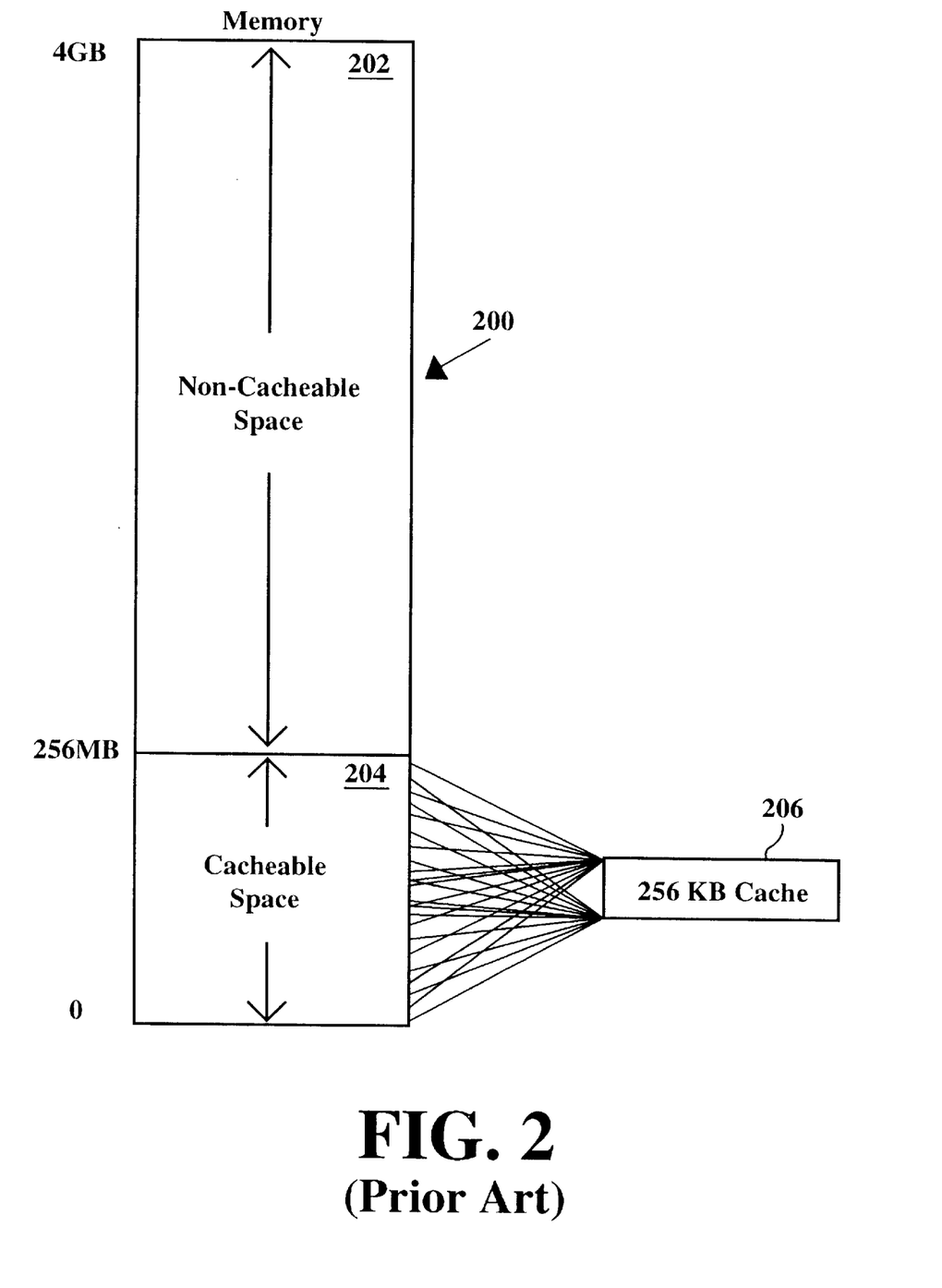
FIG. 2 represents a reduced cacheable space with contiguous memory addresses associated with a prior-art method of reconstructing the address of a cache line.

In order to shorten the cache tag width, attempts have been made to reduce the size of the cacheable space. Prior Art FIG. 2 illustrates a prior-art approach wherein only 256 megabytes (MB) of the 4 GB of total addressable space 200 are cacheable space 204. That is, the cacheable space extending from 256 MB to 4 GB is non-cacheable space 202. As a result, a shorter tag width can be used to locate a particular chunk of cache within the 256 MB of cacheable space 204. More specifically, given 256 MB of cacheable space 204 and a 256 KB cache memory 206, Equation 1 produces the resultant expression and value:

$$\log_2(256 \text{ MB}/256 \text{ KB}) = 10.$$

Hence, in the embodiment of Prior Art FIG. 2 the cache tag need only be 10 bits wide for the CPU to reconstruct the 28-bit address necessary to identify a cache line within the 256 MB of cacheable space 204. Therefore, by reducing the size of the addressable space from 4 GB to 256 MB, the cache tag width is decreased from 14 bits to 10 bits. Although this prior-art method of reducing the cacheable space decreases the width of the cache tag, such a prior-art approach is only useful when the cacheable space is contiguous.

When the cacheable space is discontiguously-arranged throughout the addressable space, the cache tag width cannot be minimized using prior-art methods. A typical prior-art method of caching data within discontiguously-arranged cacheable space requires two steps. First, the total amount of memory locations between, and including, the lowest cacheable address location and the highest cacheable address location is calculated in such a way that the size if this total amount of memory is a power of two and is aligned to a multiple of its size. Second, the resultant value of the first step is inserted into the cacheable space variable of Equation 1. Equation 1 calculates how many bits the cache tag must contain for the CPU to reconstruct the address necessary to identify a cache line within the discontiguously-arranged cacheable space.

Figure 3:
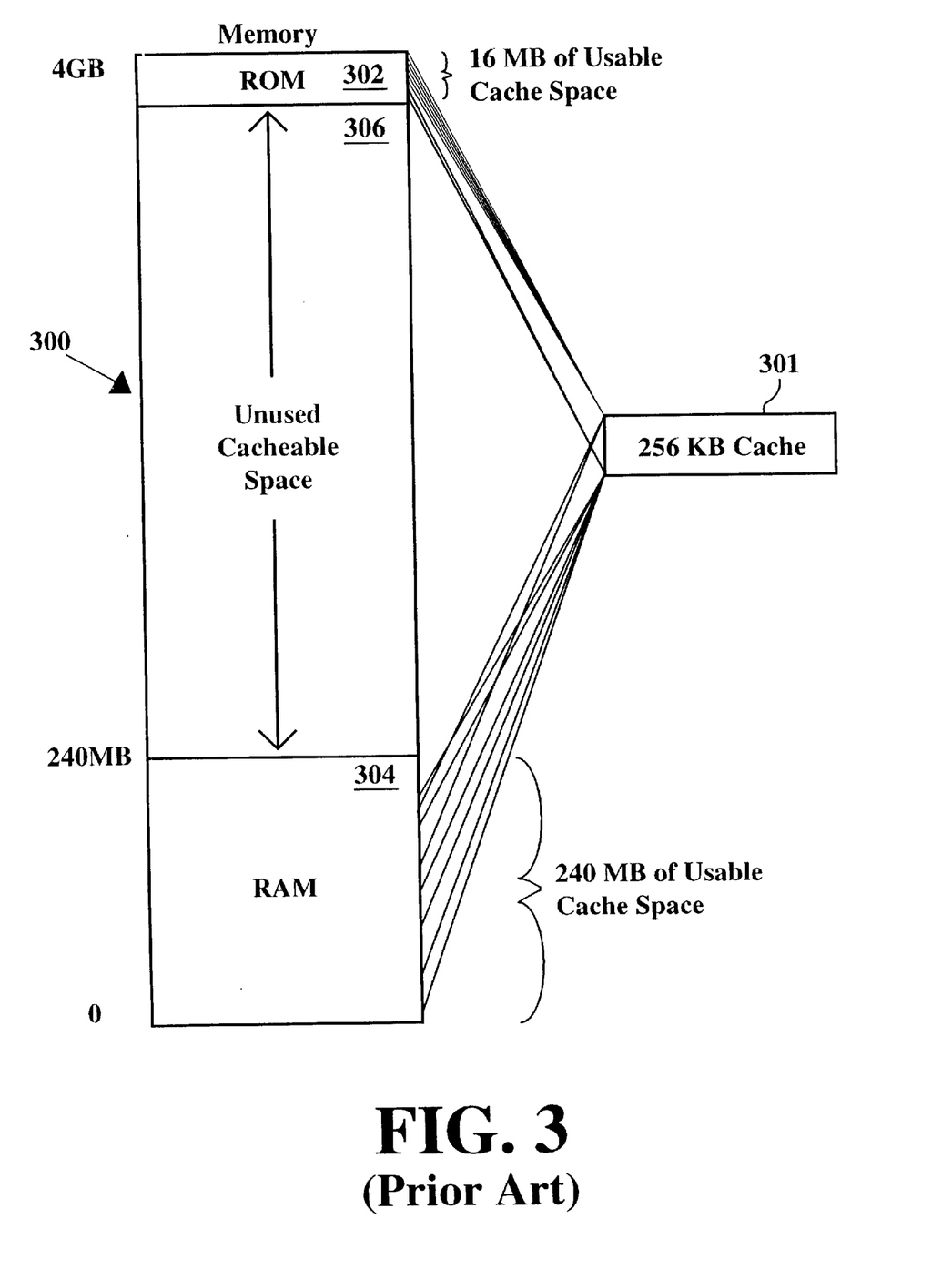
FIG. 3 represents cacheable space with discontiguously-arranged cacheable space associated with the typical prior-art method of reconstructing the address of a cache line.

As an example, Prior Art FIG. 3 schematically illustrates discontiguously-arranged cacheable space located within 4 GB of addressable space 300. The embodiment of Prior Art FIG. 3 includes a 256 KB cache memory 301. Addressable space 300 includes a total of 256 MB of cacheable space comprised of 16 MB of cacheable ROM cache space 302 and 240 MB of cacheable RAM cache space 304. The addressable space 300 further includes unused cacheable space 306. As shown in Prior Art FIG. 3, 16 MB of cacheable ROM cache space 302 is located at the highest address of 4 GB of addressable space 300, whereas the 240 MB of cacheable RAM cache space 304 is located at the lowest address of 4 GB of cacheable space 300. Thus, in order to reconstruct the address of a particular cache line within such a discontiguous configuration, typical prior-art methods first determine the amount of memory locations between, and including, the lowest cacheable address and the highest cacheable address. Hence, in the embodiment of Prior Art FIG. 3, a total of 4 GB of memory locations must be cached. The second step of the typical prior-art method is to insert the 4 GB memory location value into the cacheable space variable of Equation 1. This value is then divided by the 256 KB cache memory 301, which produces the resultant expression and value:

$$\log_2(4 \text{ GB}/256 \text{ KB}) = 14.$$

Therefore, a discontiguously-arranged cacheable space requires a 14 bit cache tag width to locate a particular cache line, even though the addressable space is only 256 MB in size. As described above, a total contiguously arranged cacheable space of 256 MB only requires a 10 bit cache tag width to address any particular chunk of cache.

Requiring longer cache tag widths results in a cache memory unit which is more expensive to produce, generates more heat, requires greater real estate, and is heavier than a cache memory unit with a shorter cache tag width. Therefore, it would be advantageous to provide a method for caching discontiguous memory address spaces with shorter cache tags.

DISCLOSURE OF THE INVENTION

The present invention provides a method and apparatus for caching discontiguous memory address spaces with shorter cache tags. More specifically, in one embodiment, the present invention includes the following steps: First the present invention receives an address for a memory location. Next, the present invention masks a first portion of the received address with an "admask" and compares the result of the admask itself to determine whether they are a predetermined value. The present invention also masks a second portion of the received address with a "tagmask" and compares the result to the tagmask itself to determine whether they are a predetermined value. Next, the present invention generates a cacheable signal provided the first portion of the received address after being masked matches the admask and the second portion of the received address after being masked matches the tagmask. In so doing, the present invention provides a method and apparatus for caching discontiguous memory address spaces with shorter cache tags.

In a configuration including a tag RAM, the present invention includes the features of the above embodiment along with the following features: First the present invention receives a tag from a tag RAM, the received tag corresponds to a third portion of the received address. Next, the present invention compares a fourth portion of the address with the tag. The present invention generates a hit signal provided the tag and the fourth portion of the address are a predetermined value. The present invention generates a qualified hit signal if both the hit signal and the cacheable signal have been generated. In so doing, the present invention provides a method and apparatus for caching discontiguous memory address spaces with shorter cache tags.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention relates to cacheable space which is discontiguously-arranged throughout an addressable space of a computer system. In a typical cache memory environment, a user first determines the sizes of the cache memory and the cacheable memory. In the present invention, in addition to determining the size of the cache memory and the cacheable memory, the user-selected parameters must also insure that the different regions within each image of the cache memory do not alias or intersect the image of each other.

Figure 4:
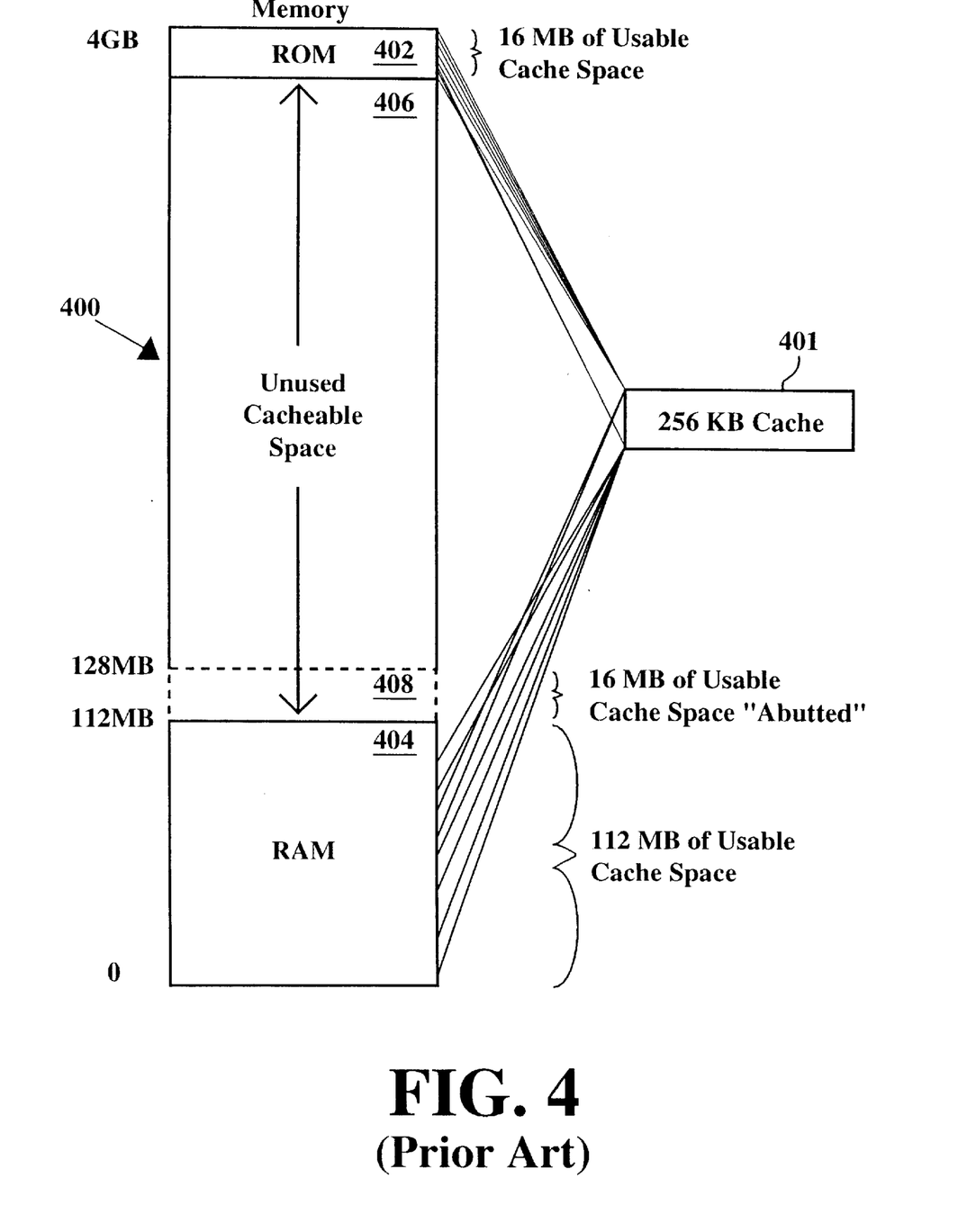
FIG. 4 is a schematic illustration of a defined discontiguously-arranged cacheable space located within 4 GB of addressable space and the abutted image of the smaller cacheable space.

FIG. 4 is a schematic illustration of a defined discontiguously-arranged cacheable space located within 4 GB of addressable space 400. The embodiment of FIG. 4 includes a 256 KB cache memory chunk 401 and unused cacheable space 406. Addressable space 400 includes a total of 128 MB of cacheable space comprised of 16 MB of cacheable ROM cache space 402 and 112 MB of cacheable RAM cache space 404. As shown in FIG. 4, 16 MB of cacheable ROM cache space 402 is located at the highest address of 4 GB of addressable space 400 while the 112 MB of cacheable RAM cache space 404 is located at the lowest address of addressable space 400.

The general purpose of the present invention is to "virtually" abut the discontiguously-arranged cacheable spaces of FIG. 4 so that a shorter cache tag width can be used to access the cacheable space. "Abutted" image 408 represents the 16 MB of cacheable ROM cache space 402 abutted next to the 112 MB of cacheable RAM cache space 404. The present invention is able to abut the two discontiguously-arranged cacheable spaces of FIG. 4 by using a "tagmask" and "admask" as part of its operation.

Both the admask and tagmask of the present invention are collections of data bits that are used to determine whether the address signal received from the system bus by the cache memory refers to a location within either cacheable space of FIG. 4. The amount of data bits the admask and tagmask must contain to perform their functions are determined once the user-selected parameters have been established as shown in FIG. 4. In the present invention, depending upon the implementation, part of the admask and tagmask may be constant and part may be variable.

In the embodiment of FIG. 4, the admask of the present invention determines whether the address received from the system bus refers to a cache location within the 128 MB of discontiguously-arranged cacheable space of 4 GB of addressable space 400. The present invention then calculates how many bits the admask must contain to determine whether the received address refers to a cache location within cacheable space. The present invention employs Equation 2 to accomplish the above described task.

$$\log_2(\text{addressable space size/cacheable size}) = \text{number of admask bits} \quad (2)$$

As shown above, the present invention divides the total amount of addressable space by the amount of discontiguously-arranged cacheable space. In so doing, the present invention determines how many different "aliases" of the total amount of discontiguously-arranged cacheable space can be located within the addressable space. After the division, the present invention then logs the resultant value by base 2 producing the amount of bits needed for the admask. In the present embodiment, the present invention generates the expression and value:

$$\log_2(4 \text{ GB}/128 \text{ MB}) = 5 \text{ admask bits}$$

Hence, the admask of the present embodiment utilizes 5 bits to determine if the address received from the system bus refers to a cache location within the lowest 128 MB of 4 GB of addressable space 400.

The present invention also employs a tagmask. The tagmask is used to determine whether the address received from the system bus refers to a cache location within the top 16 MB of any 128 MB "image" of cacheable space within 4 GB of addressable space 400. The present invention then calculates how many bits the tagmask must contain to operate properly. The present invention employs Equation 3 to accomplish the above-described task. The SCPCS variable of Equation 3 is equal to the log to the base 2 of the smallest contiguous portion of cacheable space (SCPCS) within the addressable space. In the present embodiment, 16 MB of cacheable ROM space 402 is the smallest component/portion of cacheable space within the cacheable space 400.

$$\log_2(\text{size of cacheable space/SCPCS}) = \text{No. of tagmask bits} \quad (3)$$

As shown above, the present invention divides the addressable space by the smallest component/portion of cacheable space. In so doing, the present invention determines how many different "aliases" of the smallest component of cacheable space can be located within the total amount of cacheable space. After the division, the present invention then logs the resultant value of the division by base 2 producing the amount of bits needed for the tagmask. In the present embodiment, the present invention generates the expression and value:

$$\log2(128 \text{ MB}/16 \text{ MB}) = 3 \text{ tagmask bits}$$

As a result, the tagmask of the present embodiment utilizes 3 bits to determine if the address received from the system bus refers to a location within the 16 MB of cacheable ROM space 402 of the 128 MB of cacheable space of FIG. 4.

Figure 5:
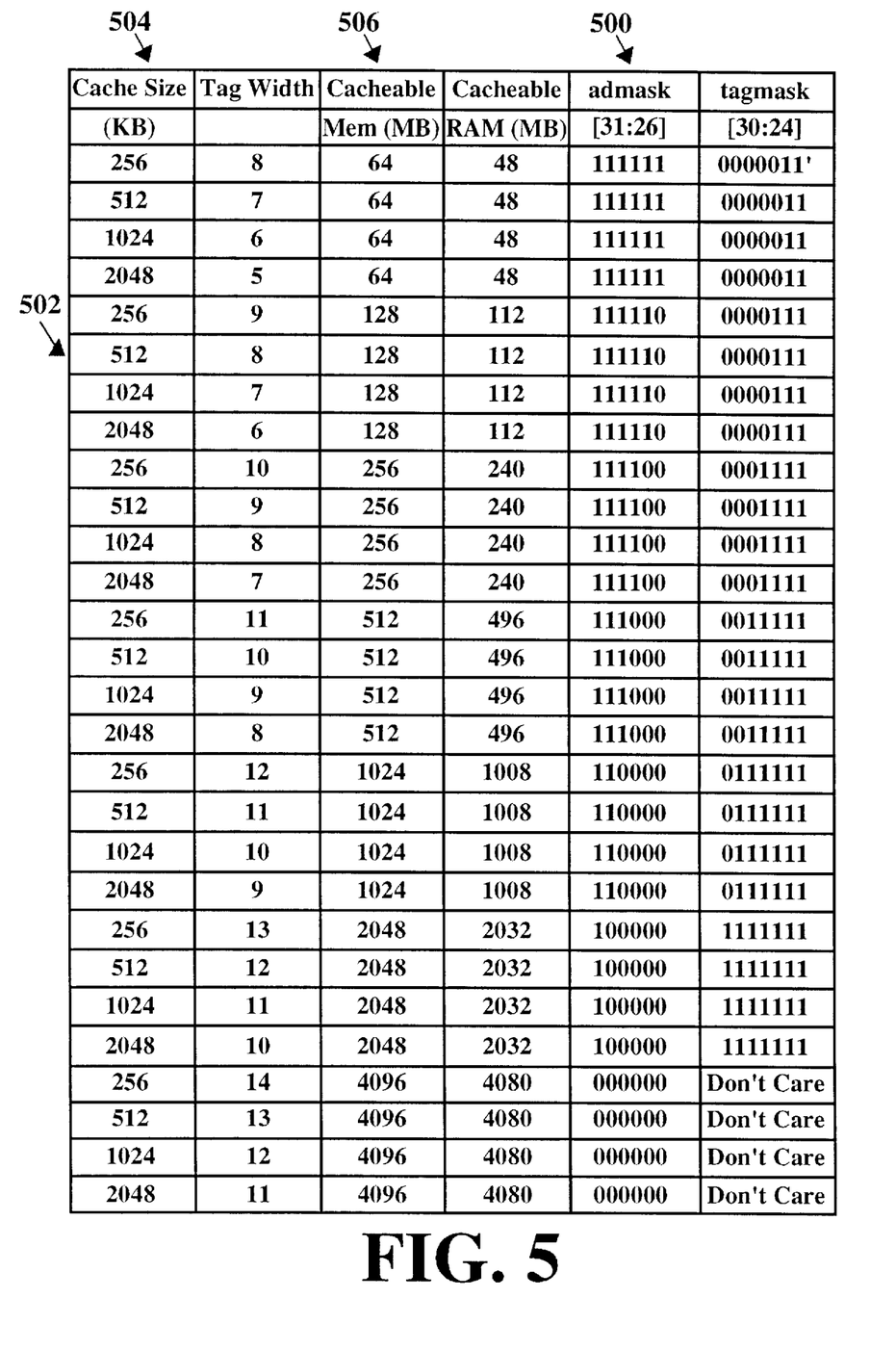
FIG. 5 is a table comprised of numerous admask and tagmask data bit combinations that are arranged within the present invention based on some constant and variable values of FIG. 4.

With reference to FIG. 5, a table 500 of various admask and tagmask values is shown. Table 500 is comprised of numerous admask and tagmask data bit combinations that are arranged within the present invention based on some constant and variable values of FIG. 4. That is, values of table 500 are based on the fact that there exists within FIG. 4 a 16 MB of cacheable ROM cache space 402 located in the highest memory address spaces of 4 GB of addressable space 400 while the remaining cacheable space is located in the lowest memory address spaces of the addressable space 400. The admask and tagmask bit combinations of zero bits and one bits of FIG. 5 vary based on the size of the total amount of cacheable space of column 506. As the cacheable space increases, the number of one bits increases in the tagmask and decreases in the admask.

To begin its operations, the present invention extracts portions of the address signal received from the system bus. Once these data bits are extracted, the present invention uses the "one" bits located within the tagmask and admask of table 500 to further draw out desired data bits from the extracted portions of the address signal. Moreover, the present invention uses the "zero" bits within the tagmask and admask to eliminate the undesirable data bits from the extracted portions of the address signal. The present invention's use of the zero bits within the tagmask and admask is commonly referred to as "masking out" the undesirable bits received from the address signal.

Line 502 of FIG. 5 represents the selected cache size and cacheable space of the embodiment shown in FIG. 4 along with the corresponding admask and tagmask data bits for the present invention. The admask and tagmask of line 502 contain 6 and 7 bits of data respectively. The number of bits of data for the admask and tagmask of line 502 are greater than the resultant number of bits required in Equations 2 and 3. The increased number of bits allows a cache designer the versatility to design the many different cache memory units represented by all the rows shown in table 500.

By examining the tagmask bits of line 502, one can more fully understand the versatility that the increased data bits of the tagmask and admask of FIG. 5 provide a cache designer. The tagmask of line 502 contains 4 data bits with the value of zero and 3 data bits with the value of one. The number of one bits within the tagmask directly corresponds to the resulting value determined by the present invention utilizing Equation 3. For the embodiment of FIG. 4, the present invention determined from Equation 3 that the tagmask must contain 3 bits to operate properly. The one bits within the tagmask of line 502 represent those required 3 bits. As the amount of cacheable space increases in column 506 of FIG. 5, the required number of one bits within the tagmask increases while the number of zero bits decreases. Since the tagmask has 7 data bits, it can be used by the present invention for all the different cache memory configurations of table 500. By allowing the tagmask and admask to have an increased number of data bits, a cache designer is afforded the versatility to design all the different cache memory units represented in table 500.

Figure 6:
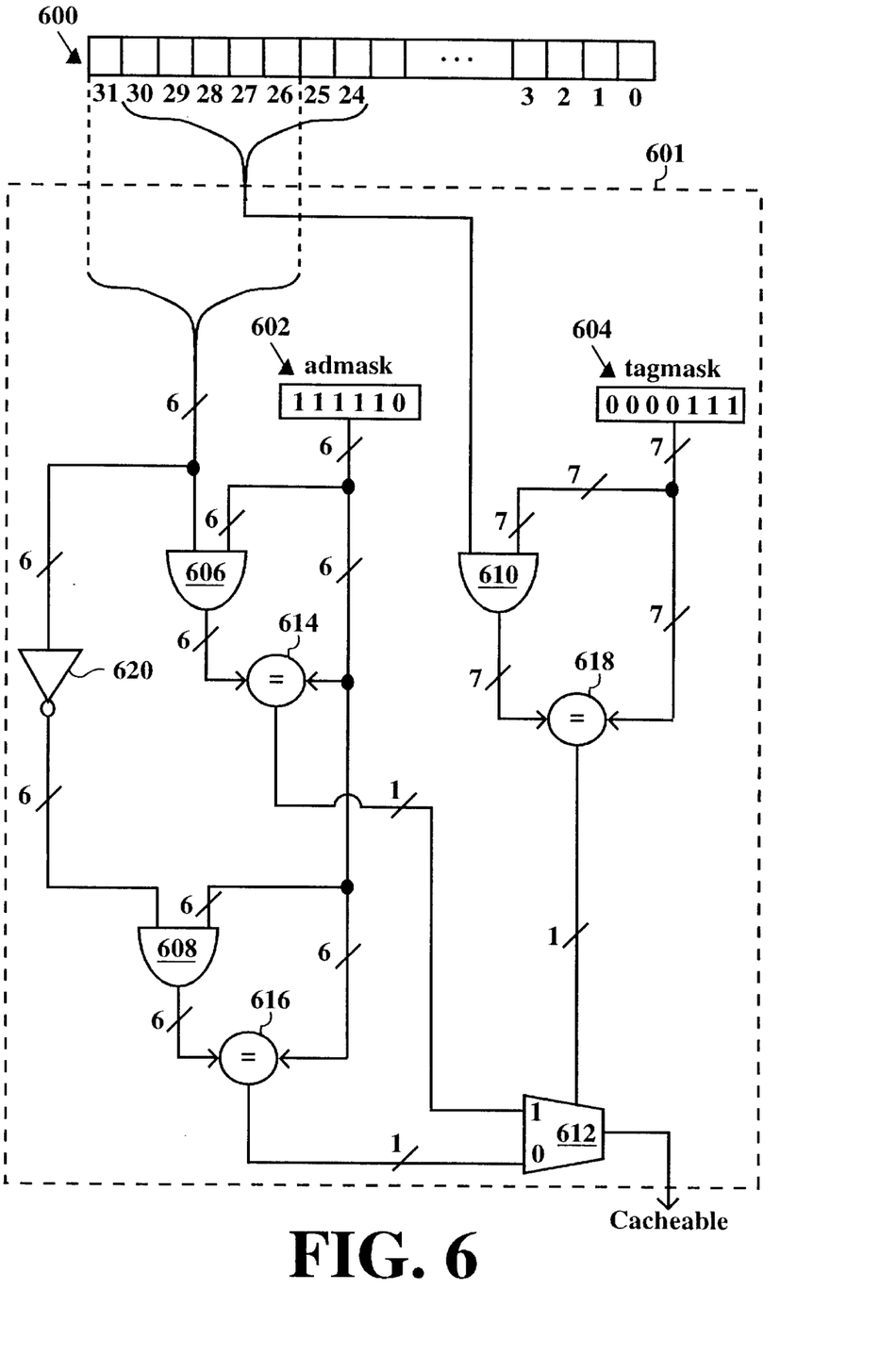
FIG. 6 illustrates a circuit diagram of an embodiment of the present invention and a schematic representation of a received address signal from the system bus.

FIG. 6 illustrates a circuit diagram of an embodiment of the present invention that will be referred to as the g function 601. FIG. 6 also illustrates a schematic representation of a received address signal 600 from the system bus. In the present embodiment, bit-wise AND gate 606 receives address bits 31–26 of address signal 600 along with the admask data bits of line 502, of FIG. 5, stored in admask register 602. Bit-wise AND gate 606 masks out the undesirable bits received from address bits 31–26. Comparator 614 receives the output data bits of bit-wise AND gate 606 along with the data bits stored in admask register 602. Comparator 614 of the present embodiment issues a logical high signal (e.g., 5 volts) to the "1" input of MUX 612 if the received data bits are the same. If the received data bits are not the same, comparator 614 issues a low signal (e.g., 0 volts) to the "1" input of MUX 612.

While address bits 31–26 of address signal 600 are received by bit-wise AND gate 606 of FIG. 6, inverter 620 of the present embodiment also receives address bits 31–26. Inverter 620 inverts each bit value of address bits 31–26 of address signal 600. Inverter 620 passes the inverted address bits 31–26 to bit-wise AND gate 608. Bit-wise AND gate 608 receives the inverted address bits 31–26 along with the data bits stored in admask register 602. Bit-wise AND gate 608 of the present embodiment masks out the undesirable bits of the inverted values of address bits 31–26. Comparator 616 receives the output data bits from bit-wise AND gate 608 along with the data bits stored in admask register 602. Comparator 616 of the present embodiment issues a high signal (e.g., 5 volts) to the "0" input of MUX 612 if the received data bits are the same. If the received data bits are not the same, comparator 616 issues a low signal (e.g., 0 volts) to the "0" input of MUX 612.

The embodiment of FIG. 6 processes address bits 31–26 of address signal 600 at the same time it processes address bits 30–24. Bit-wise AND gate 610 of the present embodiment receives address bits 30–24 of address signal 600 along with the tagmask data bits of line 502, of FIG. 5, stored in tagmask register 604. Bit-wise AND gate 610 masks out the undesirable bits received from address bits 30–24. Comparator 618 of the present embodiment receives the output data bits from the bit-wise AND gate 610 along with the data bits stored in tagmask register 604. Comparator 618 issues a high signal (e.g., 5 volts) to the control input (selector) of MUX 612 if the received data bits are the same. If the received data bits are not the same, comparator 618 issues a low signal (e.g., 0 volts) to the control input of MUX 612.

If comparator 618 of FIG. 6 issues a high signal to the control input of MUX 612, the received signal at the high input of MUX 612 is transferred to its output. If comparator 618 issues a low signal to the control input of MUX 612, the received signal at the low input of MUX 612 is transferred to its output. In so doing, the present invention indicates whether the address received from the system bus is referencing a memory location within discontiguously-arranged cacheable space.

Thus, the present invention shortens the required cache tag width. The cache controller logic "believes" that the 16 MB of cacheable ROM space 402 is located in "abutted" image 408. The present invention "tricks" the cache controller logic of the cache memory unit into "believing" that only contiguously arranged cacheable space exists within the addressable space 400.

Figure 7:
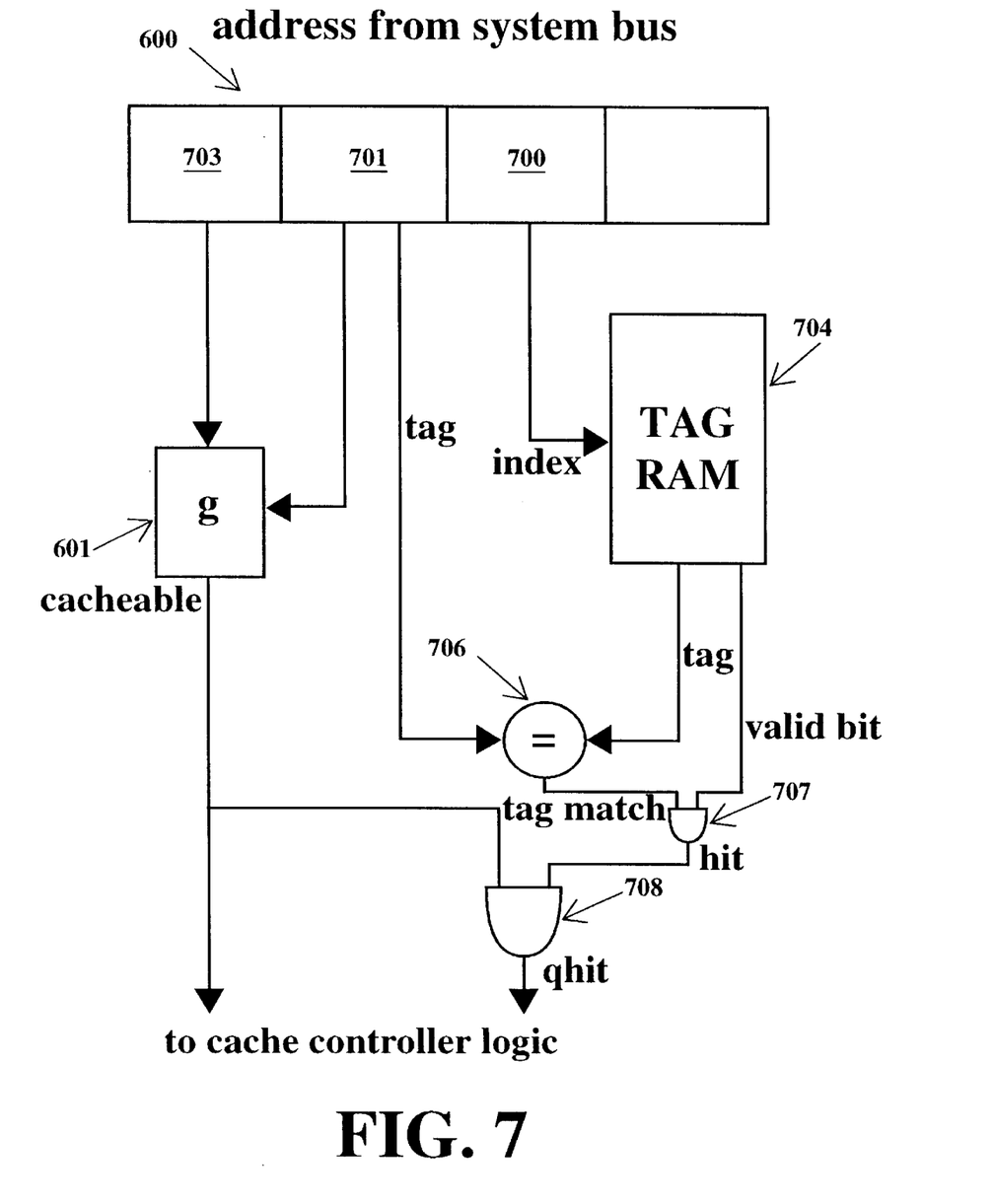
FIG. 7 is a schematic illustration of an embodiment of the present invention within a cache memory unit of a computer system.

FIG. 7 is a schematic illustration of an embodiment of the present invention within a cache memory unit of a computer system. Tag RAM 704 is used to determine if the address signal 600 received by the cache memory unit is referencing a memory location which is stored within cache memory.

As shown in FIG. 7, tag RAM 704 receives index bits 700 of address signal 600. Tag RAM 704 then issues the corresponding tag data bits stored within tag RAM 704. Next, the tag data bits are sent by tag RAM 704 to comparator 706 which also receives the tag bits 701 of address signal 600. Comparator 706 of the present embodiment determines if the received tag data bits are the same as the received tag bits 701. If the received data bits are the same, comparator 706 issues a high signal (e.g., 5 volts) to AND gate 707. If a high valid bit signal and a high signal from comparator 706 are received at AND gate 707, then AND gate 707 passes a high signal to AND gate 708 indicating an exact match of bits or a hit. Comparator 706 issues a low signal (e.g., 0 volts) to AND gate 707 if the received bits are not the same.

While tag RAM 704 of FIG. 7 receives index bits 700 of address signal 600, the g function 601 receives the predefined cache bits 703 and a portion of the tag bits 701 of address signal 600. G function 601 of the present invention determines whether the received address signal 600 refers to any cache location within the 128 MB of discontiguously-arranged cacheable space of FIG. 4. If g function 601 determines that address signal 600 refers to a cache location within cacheable space, it issues a high signal (e.g., 5 volts) to AND gate 708 and the cache controller logic. If g function 601 determines that address signal 600 refers to a cache address not located within cacheable space, it issues a low signal (e.g., 0 volts) to AND gate 708 and the cache controller logic.

AND gate 708 of FIG. 7 receives the hit signal from comparator 706 via AND gate 707 and the cacheable signal from g function 601. If both received signals are high signals, AND gate 708 issues a high signal (e.g., 5 volts) to the cache controller logic indicating a qualified hit (qhit). The qhit signal indicates to the cache controller logic that address signal 600 refers to a cache location within the 128 MB of cacheable space of FIG. 4 and that valid data for that address resides in addressable space 400. If both the cacheable signal issued by g function 601 and the hit signal issued by comparator 706 are not high signals, AND gate 708 issues a low signal (e.g., 0 volts) to the cache controller logic. This low signal indicates to the cache controller logic that the received address signal 600 does not refer to a cache location within the 128 MB of cacheable space of FIG. 4 and/or that valid data for that address does not reside in cacheable memory 400.

Thus, g function 601 of the present invention determines if the address signal 600 received from the system bus refers to the discontiguously-arranged cacheable space within the 4 GB addressable space. Furthermore, tag RAM 704 of the present invention determines whether or not valid data for address signal 600 resides in cache.

Figure 8A:
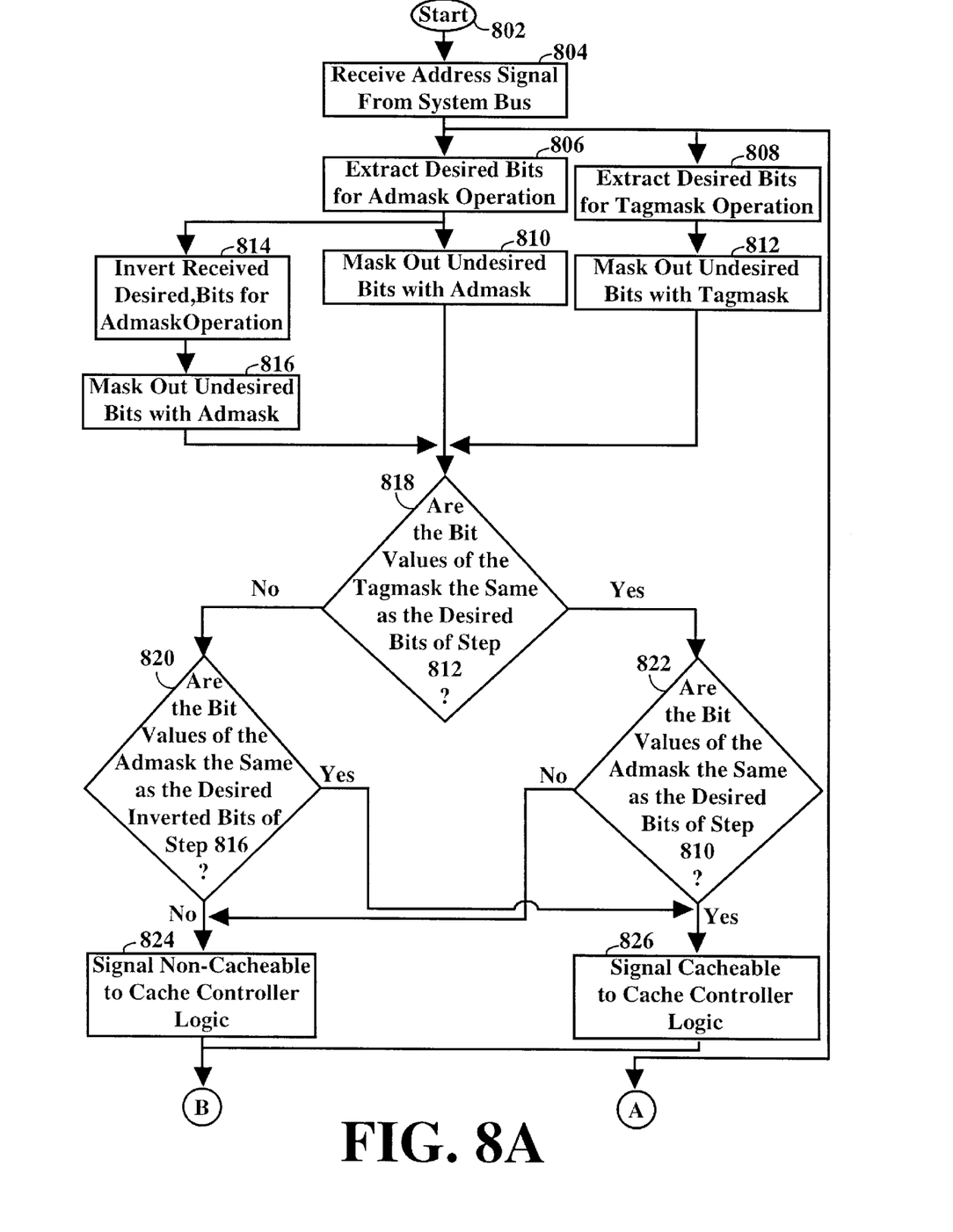
FIGS. 8A and 8B are a flow chart of steps performed by the present invention during its operation.
Figure 8B:
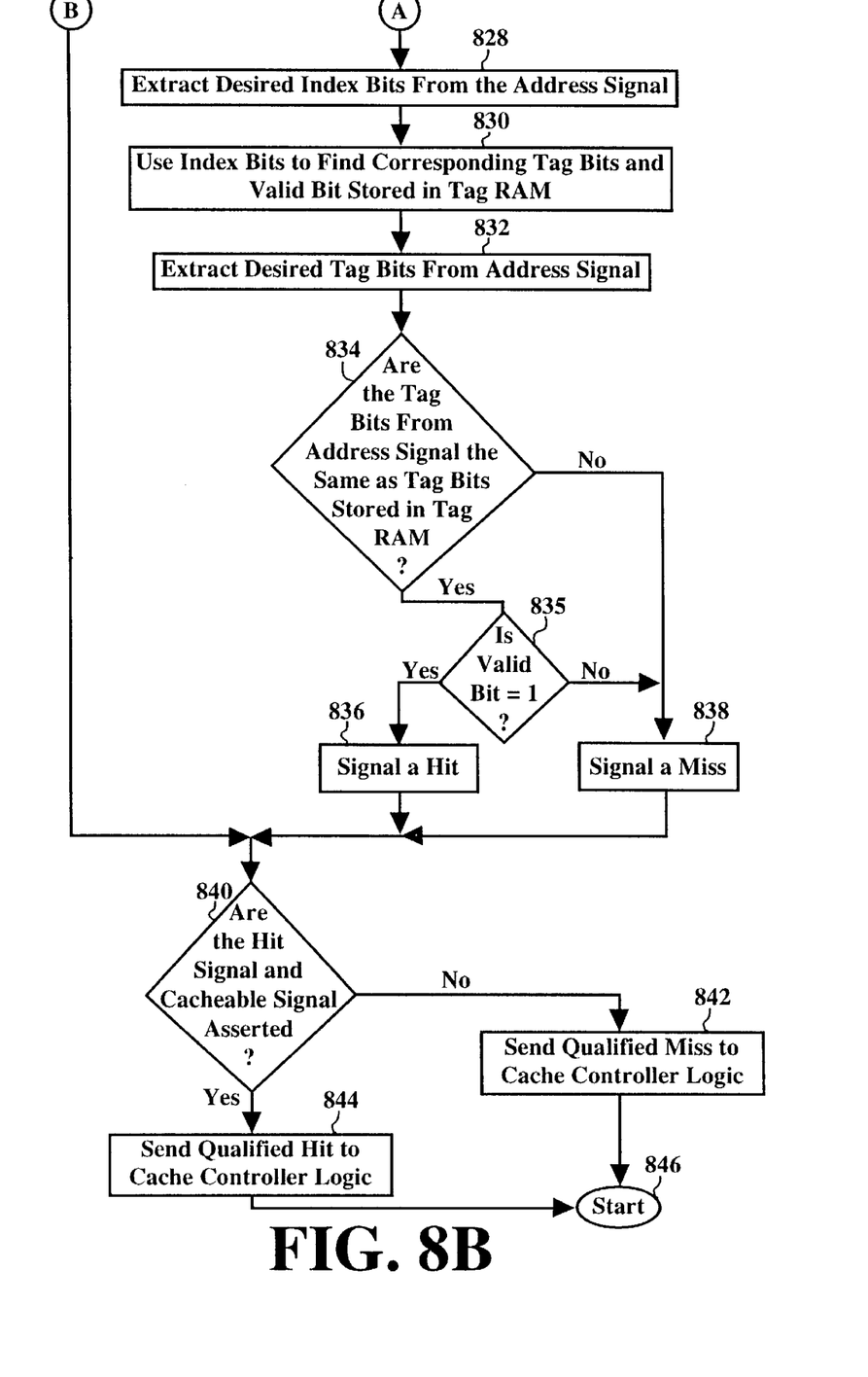

With reference to FIGS. 8A and 8B, a flow chart of steps performed by the present invention is shown. The present invention starts its operation at step 802 of FIG. 8A and proceeds to step 804.

At step 804, the present embodiment receives an address signal, 32 bits long in the embodiment of FIG. 6, from the system bus of a computer system. From step 804, the present embodiment proceeds to step 806.

Next, at step 806, the present embodiment extracts certain predefined address bits from the address signal received in step 804 that will be used within the admask operation of the present embodiment.

At step 810, the present embodiment uses the admask to mask out the undesirable bits extracted from the address signal during step 806. From step 810, the present embodiment proceeds to step 818.

While the present embodiment performs step 810, it also performs step 814. During step 814, the present embodiment inverts all the bit values extracted from the address signal during step 806. From step 814, the present embodiment proceeds to step 816.

At step 816, the present embodiment uses the admask to mask out the undesirable bits of the inverted bits of step 814. From step 816, the present embodiment proceeds to step 818.

While the present embodiment performs step 806, it also performs step 808. During step 808, the present embodiment extracts certain predefined address bits from the address signal of step 804 that will be used within the tagmask operation of the present embodiment. From step 808 the present embodiment proceeds to step 812.

At step 812, the present embodiment uses the tagmask to mask out the undesirable bits extracted from the address signal during step 808. From step 812, the present embodiment proceeds to step 818.

At step 818, the present embodiment determines if the data bits located within the tagmask are the same as the resultant data bits of step 812. If the data bits are the same, the present embodiment proceeds to step 822.

At step 822, the present embodiment determines if the data bits located in the admask are the same as the resultant data bits of step 810. If the data bits are the same, the present embodiment proceeds to step 826.

At step 826, the present embodiment signals the cache controller logic that the received address signal refers to a cache memory location within the cacheable space. From step 826, the present embodiment proceeds to step 840 of FIG. 8B.

If the data bits are not the same during step 822, the present embodiment proceeds to step 824. During step 824, the present embodiment signals the cache controller logic that the received address signal does not refer to a cache memory location within the cacheable space. From step 824, the present embodiment proceeds to step 840 of FIG. 8B.

If the data bits are not the same during step 818, the present embodiment proceeds to step 820. At step 820, the present embodiment determines if the data bits located within the admask are the same as the resultant data bits of step 816. If the data bits are the same, the present embodiment proceeds to step 826, discussed above. If the data bits are not the same, the present embodiment proceeds to step 824, also discussed above.

While the present embodiment performs step 806, it also performs step 828 of FIG. 8B. During step 828, the present embodiment extracts the index bits from the address signal. From step 828 the present embodiment proceeds to step 830.

At step 830, the present embodiment uses the index bits from the address signal to locate the corresponding tag bits and the valid bit that are stored within the tag RAM. From step 830, the present embodiment proceeds to step 832.

Next, at step 832, the present embodiment extracts the tag bits located within the address signal. From step 832, the present embodiment proceeds to step 834.

At step 834, the present embodiment determines if the tag data bits extracted from the address signal are the same as the data bits stored within the tag RAM. If the data bits are the same, the present embodiment proceeds to step 835.

At step 835, the present embodiment determines if the valid bit is a "1". If the valid bit is a "1", the present invention proceeds to step If the data bits are the same, the present embodiment proceeds to step 836.

At step 836, the present embodiment issues a hit signal within itself indicating that valid data for the address signal resides in cache. From step 836, the present embodiment proceeds to step 840.

If the data bits are not the same during step 834 or if the valid bit is not a "1" at step 835, the present embodiment proceeds to step 838. During step 838, the present embodiment issues a miss signal within itself indicating that valid data for the address signal does not reside within cache. From step 838, the present embodiment proceeds to step 840.

At step 840, the present embodiment determines if the hit signal of step 836 and the cacheable signal of step 826, of FIG. 8A, have been activated within itself. If both signals have been activated, the present embodiment proceeds to step 844.

Next, at step 844, the present embodiment issues a qualified hit signal to the cache controller logic. The qualified hit signal indicates that the received address signal refers to cacheable space within discontiguously-arranged cache space and that valid data for that address resides in cache. From step 844, the present embodiment proceeds to step 846.

At step 846, the present embodiment ends its operation within the cache memory unit of a computer system.

If both signals have not been activated during step 840, the present embodiment proceeds to step 842. During step 842, the present embodiment sends a qualified miss signal to the cache controller logic. The qualified miss signal indicates that the received address signal does not refer to cacheable space within discontiguously-arranged cache space and/or that valid data for that address does not reside in cache. From step 842, the present embodiment proceeds to step 846, discussed above.

Thus, the present invention provides a method and apparatus for caching discontiguous memory address spaces with shorter cache tags.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for determining whether an address corresponds to a cacheable memory location within a discontiguously-arranged memory space, said method comprising the steps of:

a) receiving an address;

b) comparing a first portion of said address to an admask, wherein said admask contains at least as many bits as are determined by the relationship:

minimum number of admask bits=log2(size of addressable space/size of cacheable space)

wherein said addressable space is a total amount of memory space available for use as cache memory and wherein said cacheable space is the amount of said addressable space allocated as said cache memory;

c) determining whether said first portion of said address matches said admask;

d) comparing a second portion of said address to a tagmask;

e) determining whether said second portion of said address matches said tagmask; and f) generating a cacheable signal provided said first portion of said address matches said admask and provided said second portion of said address matches said tagmask.

2. The method as recited in claim 1 further comprising the steps of:

g) comparing a third portion of said address to a stored address;

h) determining whether said third portion of said address matches said stored address; and i) generating a qualified hit signal provided a cacheable signal was generated in step f) and provided said third portion of said address matches said stored address.

3. The method as recited in claim 2 wherein said stored address of step g) is stored within a tag random access memory location.

4. The method as recited in claim 2 wherein said determining step h) determines if said third portion of said address refers to a location in cache memory space.

5. The method as recited in claim 1 wherein said tagmask contains at least as many bits as are determined by the relationship:

minimum number of tagmask bits=log2(cacheable space/smallest contiguous portion of cacheable space)

wherein said cacheable space is said amount of said cacheable space allocated as said cache memory and wherein said smallest contiguous portion of cacheable space is the smallest component/portion of contiguously arranged memory locations.

6. The method as recited in claim 1 wherein said determining step c) determines if said first portion of said address refers to a memory location within cacheable space.

7. The method as recited in claim 1 wherein said determining step e) determines if said second portion of said address refers to a memory location within a predetermined portion of cacheable memory space.

8. A circuit for determining whether an address location resides within a cacheable portion of discontiguously-arranged cache space, said circuit comprising:

a first logic device adapted to receive a first portion of an address;

a second logic device adapted to receive a second portion of said address;

an admask register coupled to an input of said first logic device, wherein said admask resister contains at least as many bits as are determined by the relationship:

minimum number of admask bits=log2(size of addressable space/ size of cacheable space)

wherein said addressable space is a total amount of memory space that can be addressed by the processor and wherein said cacheable space is the amount of said addressable space whose memory locations can be stored in cache memory;

a tagmask register coupled to an input of said second logic device;

a first comparator coupled to said admask register and an output of said first logic device, such that said comparator compares the output of said first logic device with contents of said admask register;

a second comparator coupled to said tagmask register and an output of said second logic device, such that said comparator compares the output of said second logic device with contents of said tagmask register; and a third logic device coupled to an output of said first comparator and coupled to an output of said second comparator, said third logic device adapted to generate a cacheable signal provided said first and said second comparators output a predetermined value.

9. The circuit of claim 8 wherein said first logic device is comprised of an array of 2-input AND gates.

10. The circuit of claim 8 wherein said second logic device is comprised of an array of 2-input AND gates.

11. The circuit of claim 8 wherein said third logic device is comprised of a 2:1 multiplexor.

12. The circuit of claim 8 wherein said tagmask register contains at least as many bits as are determined by the relationship:

minimum number of tagmask bits=log2(cacheable space/smallest contiguous portion of cacheable space)

wherein said cacheable space is the amount of addressable space whose memory locations can be stored in cache memory and wherein said smallest contiguous portion of cacheable space is the smallest component/portion of contiguously arranged memory locations.

13. The circuit of claim 8 wherein said third logic device is adapted to generate said cacheable signal provided said first and said second comparators output an identical value.

14. The circuit of claim 8 further comprising:

a storage device having input and output, said input adapted to receive a third portion of said address, said storage device further adapted to output a portion of stored data corresponding to said received third portion of said address; and a third comparator adapted to receive a fourth portion of said address and received said portion of said stored data output from said storage device, said third comparator adapted to compare said portion of said portion of said stored data output from said storage device with said fourth portion of said address, said third comparator adapted to generate a tag match signal provided said stored data output from said storage device and said fourth portion of said address are a predetermined value.

15. The circuit of claim 14 wherein said storage device is comprised of a tag random access memory.

16. The circuit of claim 14 wherein said third comparator is adapted to generate said tag match signal and pass said tag match signal to a logic gate provided said stored data output from said storage device and said fourth portion of said address are identical value.

17. The circuit of claim 14 further comprising a fourth logic device coupled to an output of said third comparator and coupled to a (different) portion of said stored data output from said storage device, said fourth logic device adapted to generate a hit signal provided said third comparator and said (different) portion of said stored data output from said storage device output a predetermined value.

18. The circuit of claim 17 wherein said fourth logic device is composed of an AND gate.

19. The circuit of claim 17 wherein said fourth logic device is adapted to generate said hit signal and pass said hit signal to a logic gate provided said (different) portion of said stored data output from said storage device and said output of said third comparator both have a logic "high" value.

20. The circuit of claim 17 further comprising a fifth logic device coupled to an output of said fourth logic device and coupled to an output of said third logic device, said fifth logic device adapted to generate a qualified hit signal provided said fourth logic device and said third logic device output a predetermined value.

21. The circuit of claim 20 wherein said fourth logic device is comprised of an AND gate.

22. The circuit of claim 20 wherein said fifth logic device is adapted to generate said qualified hit signal provided said fourth logic device and said third logic device both output a logic "high" value.

23. A method for determining whether an address corresponds to a cacheable memory location within a discontiguously-arranged memory space, said method comprising the steps of:

a) receiving an address;

b) comparing a first portion of said address to an admask, wherein said admask contains at least as many bits as are determined by the relationship:

minimum number of admask bits=log2(size of addressable space/ size of cacheable space)

wherein said addressable space is a total amount of memory space that can be addressed by the processor and wherein said cacheable space is the amount of said addressable space whose memory locations can be stored in cache memory;

c) determining whether said first portion of said address refers to a memory location within cacheable space;

d) comparing a second portion of said address to a tagmask;

e) determining whether said second portion of said address refers to a memory location within a predetermined portion of said cacheable space;

f) generating a cacheable signal provided said first portion of said address refers to a memory location within cacheable space and provided said second portion of said address refers to a memory location within a predetermined portion of said cacheable space;

g) comparing a third portion of said address to a stored address;

h) determining whether said third portion of said address matches said stored address;

i) generating a hit signal provided a valid bit was extracted from said tag RAM and provided said third portion of said address matches said stored valid bit; and j) generating a qualified hit signal provided a hit signal was generated in step i) and a cacheable signal was generated in step f) and provided that these two signals both have logic "high" values.

24. The method as recited in claim 23 wherein said tagmask contains at least as many bits as are determined by the relationship:

minimum number of tagmask bits=log2(cacheable space/smallest contiguous portion of cacheable space)

wherein said cacheable space is the amount of addressable space whose memory locations can be stored in cache memory and wherein said smallest contiguous portion of cacheable space is the smallest component/portion of contiguously arranged memory locations.

25. The method as recited in claim 23 wherein said determining step h) determines if said third portion of said address refers to a location in cache memory space.

* * * * *